(12) United States Patent
Leiber et al.

(10) Patent No.: US 9,278,679 B2
(45) Date of Patent: Mar. 8, 2016

(54) SAFETY CIRCUIT FOR BLOCKING DRIVE OF A BRAKE BOOSTER

(75) Inventors: Heinz Leiber, Oberriexingen (DE); Valentin Unterfrauner, Munich (DE); Christian Koeglsperger, Geretsried (DE)

(73) Assignee: IPGATE AG, Pfäffikon (CH)

( * ) Notice: Subject to any disclaimer, the term of this patent is extended or adjusted under 35 U.S.C. 154(b) by 58 days.

(21) Appl. No.: 14/232,994

(22) PCT Filed: Jul. 15, 2011

(86) PCT No.: PCT/EP2011/003533
§ 371 (c)(1),
(2), (4) Date: Jan. 15, 2014

(87) PCT Pub. No.: WO2013/010554
PCT Pub. Date: Jan. 24, 2013

(65) Prior Publication Data
US 2014/0159474 A1    Jun. 12, 2014

(51) Int. Cl.
*B60T 13/66* (2006.01)
*B60T 7/04* (2006.01)
*B60T 13/68* (2006.01)
(Continued)

(52) U.S. Cl.
CPC .............. *B60T 13/662* (2013.01); *B60T 7/042* (2013.01); *B60T 8/176* (2013.01); *B60T 8/1755* (2013.01); *B60T 8/4077* (2013.01); *B60T 8/885* (2013.01); *B60T 13/686* (2013.01); *B60T 13/745* (2013.01); *B60T 2270/402* (2013.01)

(58) Field of Classification Search
CPC ......... B60T 8/48; B60T 13/18; B60T 13/662; B60T 8/76; B60T 8/1755
USPC .............. 303/10, 11, 113.3–113.5, 14, 115.1, 303/115.2, 122, 122.04, 122.06, 122.09, 303/122.11
See application file for complete search history.

(56) References Cited

U.S. PATENT DOCUMENTS

| 2003/0201669 A1 | 10/2003 | Yokoyama et al. |
| 2005/0088039 A1* | 4/2005 | Yang .............................. 303/11 |
| 2009/0045672 A1* | 2/2009 | Nishino et al. ............. 303/113.3 |

FOREIGN PATENT DOCUMENTS

| DE | 102004050103 A1 | 4/2006 |
| DE | 102005018649 A1 | 10/2006 |

(Continued)

OTHER PUBLICATIONS

International Preliminary Report on Patentability issued in PCT/EP2011/003533, date of issuance Jan. 21, 2014.
(Continued)

*Primary Examiner* — Melanie Torres Williams
(74) *Attorney, Agent, or Firm* — Panitch Schwarze Belisario & Nadel LLP

(57) ABSTRACT

The invention relates to a brake system having a brake booster, in which pressure medium can be guided by means of at least one switchable valve (7, 15) from at least one wheel brake (10) into an accumulator chamber (8), wherein a control device controls at least the at least one switchable valve (7, 15), wherein, in the case of a disruption of the brake booster (1), in particular if the drive (11) thereof or the gear mechanism which is connected between the drive (11) and the piston of the brake master cylinder (4) is blocked, the at least one accumulator chamber (8) serves to receive pressure medium from at least one wheel brake or at least one brake circuit and therefore to dissipate pressure in at least one wheel brake.

10 Claims, 1 Drawing Sheet

(51) Int. Cl.
*B60T 13/74* (2006.01)
*B60T 8/88* (2006.01)
*B60T 8/1755* (2006.01)
*B60T 8/176* (2006.01)
*B60T 8/40* (2006.01)

(56) References Cited

FOREIGN PATENT DOCUMENTS

| DE | 102008051316 A1 | 2/2010 |
|----|-----------------|--------|
| DE | 102009043484 A1 | 3/2011 |
| DE | 102009055721 A1 | 6/2011 |
| EP | 0937620 A2 | 8/1999 |
| GB | 2207720 A | 2/1989 |
| WO | WO-2010/017998 A1 | 2/2010 |
| WO | WO-2010/088920 A1 | 8/2010 |

OTHER PUBLICATIONS

International Search Report and Written Opinion issued in PCT/EP2011/003533, mailing date Jul. 16, 2012 with English Translation of the International Search Report.

* cited by examiner

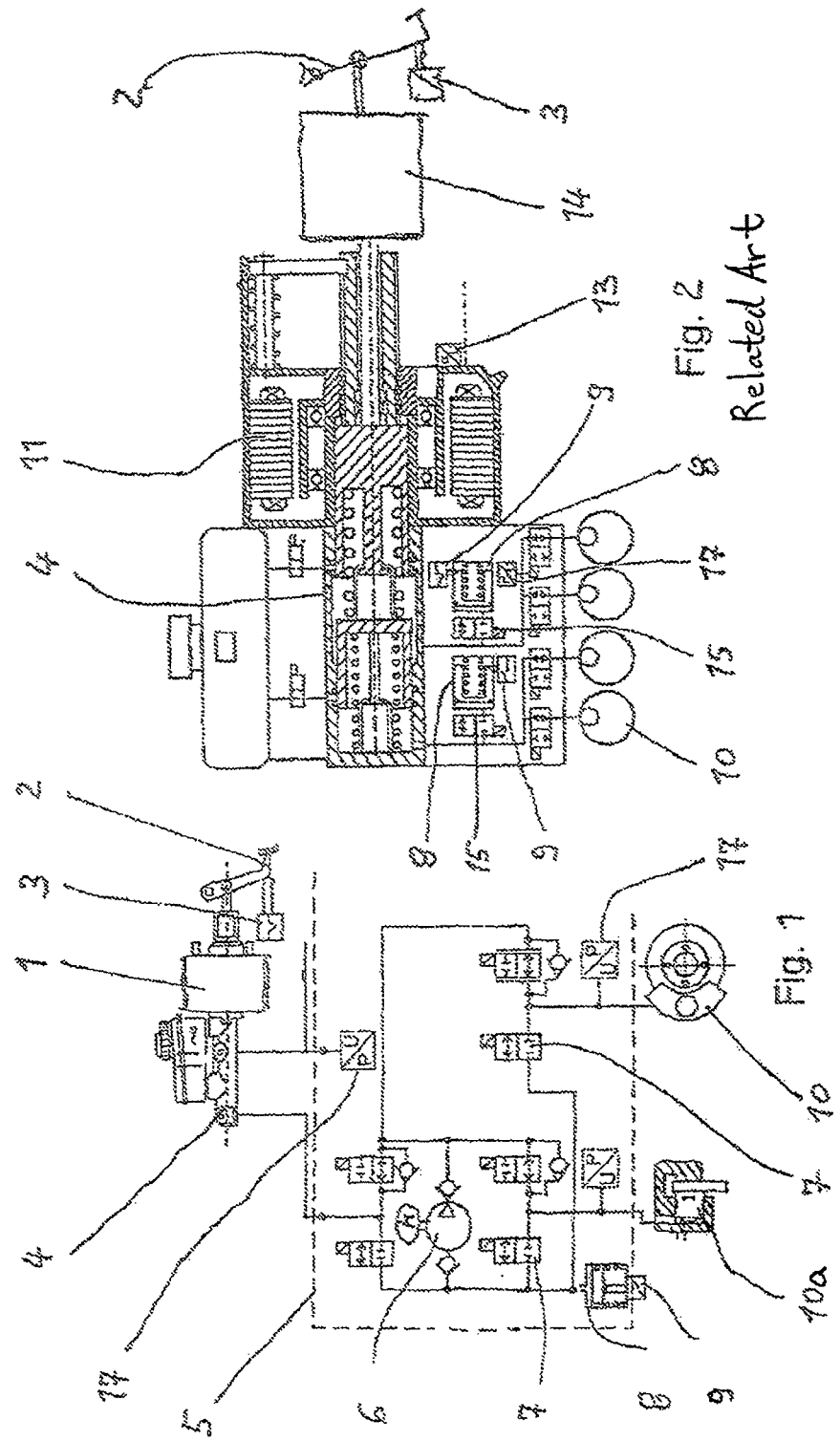

SAFETY CIRCUIT FOR BLOCKING DRIVE OF A BRAKE BOOSTER

CROSS-REFERENCE TO RELATED APPLICATIONS

This Application is a U.S. National Stage of PCT International Application No. PCT/EP2011/003533, filed on Jul. 15, 2011. The disclosures of the aforementioned application is incorporated herein in its entirety by reference.

PRIOR ART

Due to a higher functionality and also to smaller installation volumes, hydraulic brake servo units (BSU) and in particular electromechanical brake servo units will be used to an increasing extent in the future. In brake systems which have electromechanical brake servo units, a distinction is made between configurations without path simulators, as known for example from PCT/EP2009/000694 and those with path simulators, as known for example from DE 102005018649 and DE 102009055721.

In the versions of the brake servo units mentioned above, a serious safety risk arises if, during a reduction in pressure when the pedal force and pedal travel cease, the drive of the brake servo unit seizes and no further reduction in pressure is possible. This means that with a corresponding pressure level, the vehicle stands still on the road and can no longer be moved by the power of the engine. A similar situation can also occur with electrical power steering if the engine or the transmission seizes. To prevent this from happening, costly constructive measures as well as quality assurance measures are taken to avoid this situation.

The object of the invention is to provide an economical and effective measure for this malfunction in a brake system.

The object is achieved through the use of an accumulator chamber for pressure reduction in at least one wheel brake. Here, the accumulator chambers, often already present in the conventional ABS or ESP systems can be used, as known for example from DE 10 2004 050 103. In these systems, during the reduction in pressure for the ABS control, pressure medium is guided into the accumulator chamber by briefly opening the outlet valve to thereby prevent the relevant wheel from locking. The corresponding volume is pumped back into the brake circuit and brake master cylinder by the return pump.

This path is also taken in the described malfunction situation with a locking drive. If the pressure in the brake circuit is not reduced after the cessation of the pedal force or the pedal travel which is measured by appropriate sensors, then according to the invention, the outlet valve is opened for a relatively long time so that the pressure medium passes into the accumulator chamber. The return pump can also be switched on at the same time.

The high pressure which is produced by the return pump after the outlet valve has been opened can effectively push back the master cylinder pistons of the brake servo unit in spite of the seizing drive, which can be established by measuring the pressure or the change in position of the drive.

Subject to the pressure level when seizing occurs, this solution makes it possible to reduce the pressure completely or to a low level, so that the driver can move the vehicle out of the danger zone, if necessary at a reduced speed.

The previously described use of an accumulator chamber can also be used in a brake servo unit having a path simulator and accumulator chamber, as known from DE102009055721 and DE 102008051316. Here as well, in the event of a malfunction, in order to reduce pressure, pressure medium can pass into the accumulator chamber(s) after opening the magnetic valve connected upstream and the pressure in the wheel brakes can be significantly reduced thereby. Malfunction detection and pressure reduction is particularly successful in this system, since the procedure can be monitored by systemic sensors for pedal travel, master cylinder piston position and pressure which are already present.

The additional expense for the solution according to the invention of the brake pressure reduction in the event of a malfunction of the drive or transmission of the brake servo unit is advantageously very low. If an accumulator chamber is present, then merely the software, particularly in the system known from DE102009043484, has to be adapted.

In the following, the use according to the invention of at least one accumulator chamber will be described in more detail for two previously described brake systems.

FIG. 1 shows a hydraulic brake servo unit with a conventional ABS valve circuit and accumulator chamber for use in the event of a malfunction;

FIG. 2 shows an electromechanical brake servo unit with accumulator chambers which are used according to the invention to reduce pressure in the event of a malfunction of the drive or transmission.

FIG. 1 shows a conventional brake system with an ABS system having the known valve switching arrangement and pump, as well as a brake servo unit 1 for a brake circuit, which will not be described in detail.

In the upper part of the drawing, the separately arranged brake servo unit 1 with a tandem master cylinder 4 is shown which is actuated by the brake pedal 2. Connected to the brake pedal 2 is a pedal travel switch or sensor 3 which indicates the start of braking or is also used for boosting the brake force. The separate unit, designated as HCU 5 uses components for the pressure modulation of ABS and ESP. Further magnetic valves are used for ESP, for example for building up the pressure without brake servo activation, which valves are not shown. One or more pressure senders 17 are also used for this function. If a wheel slips to a relatively great extent due to an excessive braking torque, the outlet valve 7 connected to the brake piston by a hydraulic line is opened for a short time in order to reduce the pressure, as a result of which, pressure medium passes into the accumulator chamber 8 and is also pumped back to the master cylinder 4 by the return pump 6.

If the malfunction situation with a locked drive then occurs, the pedal 2 is moved in the direction of the starting position to reduce the pressure. However, due to the locked drive, the pressure reduction which matches the pedal position does not take place. To re-adjust the relationship between pedal position or pedal travel and desired pressure, all the outlet valves 7 are opened until the relationship between pedal travel and pressure sender 17 is restored. In many cases, the brake pedal 2 is moved into the starting position which should correspond to zero pressure. If the return pump 6 is then switched on at the same time, the pressure thereof acts against the locked drive which, in turn, can mean that the high pressure moves the master cylinder piston against the locked drive and the pressure is reduced according to the preset value, for example to the pedal travel. When the brake pedal 2 is in the starting position, the piston is moved in this case over the expansion port and thereby produces zero pressure which is possible in the tandem master cylinder circuit via the pressure sender.

If the locking is so great that the return pump 6 is ineffectual, then it must either be switched off at the maximally permissible pressure which is measured by the pressure sender 17 or it will seize and is disconnected via the speed or current detection. In this case, the pressure reduction is provided by the storage capacity of the accumulator chamber. If a pressure sender has not been installed in the wheel circuit, then in the event of a malfunction, the outlet valve 7 is opened until a rise in pressure is required again by a relatively great pedal travel or the outlet valves 7 remain open for a specific amount of time at "pedal in starting position" so that the accumulator chamber 8 is filled. The filling procedure always depends on the brake pressure charged before locking. If the brake pressure is in the partial brake range, the pressure can be reduced to low values without the return pump being effective, so that although the driver receives a warning message, he is easily able to drive to the next parking place. If the charged pressure is high, the driver can only drive to the next parking facility with the motor power at a relatively low speed. He can be given appropriate information in the display. He is thus able to escape the dangerous situation of being stationary on the road. This case will occur extremely rarely, because a high brake pressure also produces high restoring forces on the piston, which counteracts the entire locking effect.

FIG. 2 shows a system according to DE 102 009 043 484. This system has a path simulator with additional components which are described here only by pedal interface 14. According to the pedal travel which is preferably measured by the sensor 3, the electric motor 11 is actuated by the tandem master cylinder (TMC) 4 to produce brake pressure. Inserted into the connection line from TMC 4 to the brake caliper 10 are accumulator chambers 8 which can be filled or emptied via switchable magnetic valves 15 which are arranged or connected upstream. These can be used, for example to re-convey pressure medium into the brake circuits for controlling the brake lining clearance or for free travel control according to DE 102 009 043 484.

As in the brake system of FIG. 1, the accumulator chambers 8 can also be used in the previously described malfunction situation. The only difference is that there is no return pump. If the malfunction occurs, it is detected by comparing the pedal travel, measured by sensor 3, and the pressure in the brake master cylinder, measured by sensor 9 and the reduction in pressure corresponding to the pedal travel signal is initiated or adjusted by opening the switching valves 15, connected upstream of the accumulator chambers 8, in both brake circuits. The malfunction can also be detected and identified by comparing the pedal travel, measured by sensor 3, and the measured motor current of the drive.

In this brake system as well, as described in the brake system of FIG. 1, the reduction in pressure in the accumulator chamber 8 depends on the level of the charge pressure. In the case of relatively low values, the reduction in pressure is determined by the accumulator pressure characteristic, in the case of a piston accumulator it is determined by the effective pretension spring, which produces approximately 3 to 5 bars. This pressure is not at all critical for driving on to the next parking place using appropriate information on the display. However, what has been stated in FIG. 1 applies in the case of a high control pressure.

If pressure builds up again in the brake systems according to FIGS. 1 and 2 when driving to the parking place, this can occur in both systems by the direct effect of the brake pedal for the pistons of the tandem master cylinder. In this respect, pressure medium can be returned again into the brake circuits in the low pressure range from the accumulator by opening the valves 7 and 15. For this purpose, various control options are possible which will not be described since they do not alter the basic solution.

As already mentioned, the additional expense incurred in the solution according to the invention to effectively remedy the critical malfunction is very low.

LIST OF REFERENCE NUMERALS 1 brake servo unit (BSU)
2 brake pedal
3 pedal travel switch/sensor
4 tandem master cylinder (TMC)
5 HCU
6 return pump
7 outlet valve
8 accumulator chamber
9 accumulator chamber switch/sensor
10 brake caliper
10a brake piston
11 electric motor
12 pedal rod
13 rotation angle sender
14 pedal interface
15 magnetic valve
17 pressure sender

What is claimed is:

1. A brake system comprising:
a brake servo unit, including a drive;
at least one switchable valve configured to guide pressure medium from at least one wheel brake into an accumulator chamber; and
a control means configured to control at least the at least one switchable valve,
wherein, in the event of a malfunction of the brake servo unit, in which the drive thereof or the transmission connected between the drive and a piston of a brake master cylinder is locked, the at least one accumulator chamber is configured to receive pressure medium from at least one wheel brake or from at least one brake circuit and to thereby reduce pressure in at least one wheel brake.

2. The brake system according to claim 1, wherein a respective brake circuit has a respective accumulator chamber with an associated switchable valve configured to reduce pressure in the event of a malfunction.

3. The brake system according to claim 1, wherein the control means is configured to use the accumulator chamber for an ABS function and/or ESP function.

4. The brake system according to claim 1, further comprising a path simulator.

5. The brake system according to claim 1, wherein the control means is further configured to detect the malfunction using sensors by comparing input signal variables "piston travel" and/or "pressure in brake circuit" and/or "motor current of the drive" and "pedal travel" and/or "pedal force".

6. The brake system according to claim 1, wherein the control means is configured to implement an anti-lock braking system (ABS), and wherein the system further comprises a return pump of the ABS system configured to convey pressure medium to return the piston of the brake master cylinder into the brake master cylinder.

7. A method of using brake system according to claim 1, the method comprising:
opening, by the control means of the brake system, the at least one switchable valve in the event of a malfunction of the drive and/or of the transmission connected between the drive and the piston of the brake master cylinder to reduce the pressure in at least one wheel brake if a brake pedal has previously been actuated to build up pressure.

8. The method according to claim 7, further comprising detecting, by the control means, the malfunction using sensors, the detecting including comparing input signal variables "piston travel" and/or "pressure in brake circuit" and "pedal travel" and/or "pedal force".

9. The method according to claim 7, further comprising, when a malfunction has occurred and pressure has been reduced by means of the accumulator chamber, during a renewed braking by the brake pedal, moving the piston of the brake master cylinder to build up pressure while a respective switchable valve remaining closed.

10. The method according to claim 7, further comprising, when a malfunction has occurred and pressure has been reduced by means of the accumulator chamber, during a renewed braking by the brake pedal, guiding the pressure means stored in the accumulator chamber into at least one wheel break of an associated brake circuit to build up pressure.

* * * * *